United States Patent [19]

Manchak, Jr.

[11] Patent Number: 4,818,390

[45] Date of Patent: Apr. 4, 1989

[54] APPARATUS FOR DETOXIFICATION OF LAGOONS

[76] Inventor: Frank Manchak, Jr., 11300 Norwalk Blvd., Santa Fe Springs, Calif. 90670

[21] Appl. No.: 141,827

[22] Filed: Jan. 11, 1988

[51] Int. Cl.⁴ .................... B01D 43/00; B01D 19/04; G21F 9/04

[52] U.S. Cl. .................... 210/170; 210/205; 210/209; 210/241; 210/747; 210/749; 210/902; 210/712; 405/52; 37/75; 252/633; 252/631

[58] Field of Search .................... 210/170, 198.1, 205, 210/209, 219, 714, 751, 712, 747, 241, 242.2; 37/73–75, 116, 135, 176, 54–56; 252/628–633; 110/346; 71/25; 208/13; 405/52–57, 128, 129, 233, 258, 263, 269

[56] References Cited

U.S. PATENT DOCUMENTS

| | | | |
|---|---|---|---|
| 3,709,470 | 1/1973 | Auler et al. | 210/242.2 |
| 4,028,240 | 6/1977 | Manchak, Jr. | 210/751 |
| 4,079,003 | 3/1978 | Manchak, Jr. | 210/712 |
| 4,184,958 | 1/1980 | Manchak, Jr. | 210/170 |
| 4,268,398 | 5/1981 | Shuck et al. | 210/170 |
| 4,753,737 | 6/1988 | Staples et al. | 210/170 |

Primary Examiner—Frank Spear
Assistant Examiner—Joseph Drodge
Attorney, Agent, or Firm—Roth & Goldman

[57] ABSTRACT

Apparatus for detoxification of a hazardous waste containing lagoon comprising a bi-directionally operable cable operated process tool which is pulled through the lagoon and distributes treatment chemicals therein while being continuously supplied with the treatment chemicals from a supply thereof remote from the process tool. The process tool has a specially designed mixing throat and a flexible cable supported multi-panel shroud is disclosed for preventing the escape of toxic gases generated in the area of the process tool where mixing takes place to atmosphere.

32 Claims, 6 Drawing Sheets

APPARATUS FOR DETOXIFICATION OF LAGOONS

CROSS REFERENCES TO RELATED APPLICATIONS, IF ANY

Reference is herein made to my co-pending applications Ser. Nos. 865,745 filed Apr. 30, 1986, now U.S. Pat. No. 4,776,409, and 049,861 filed Apr. 22, 1987 which each relate generally to the field of hazardous waste detoxification and clean-up of impoundments thereof.

BACKGROUND OF THE INVENTION AND PRIOR ART

The present invention relates to a cable operated detoxification apparatus for rapid, in-place remediation of impounded chemical and low radioactive aqueous and sludge wastes as produced by sewage treatment plants or other industrial waste producing operations.

My prior U.S. Pat. Nos. 4,184,958, 4,079,003 and 4,028,240 relate to methods and apparatus comprised of a process tool which is repeatedly passed through a semi-liquid body of hazardous waste material while distributing a treatment chemical uniformly into the body of waste material. The process tool is pulled by a cable which traverses the body of hazardous material and extends between a pulling means on one side and an anchor means on the other side of the body of waste.

While the apparatus described and shown in my prior patents is useful for distributin gtreatment chemicals into a body of waste material, no means are disclosed therein for preventing the escape to atmosphere of noxious or toxic gases generated during the treatment process. Also, my prior device is limited to unidirectional distribution of chemicals where a supply of a single particular chemical to be distributed is piled in a location adjacent one end of the cable whereby the process tool is able to scoop up a supply of chemical to be distributed from the pile at one end of its pass through the waste. By the time the process tool has reached the other end of its pass, there may be too much or too little of the treatment chemical left in the process tool for effective treatment.

It is accordingly an object of the invention to provide an improved apparatus capable of bi-directionally distributing one or more of a mixture of selected treatment chemicals from storage supplies thereof at rates dependent on the conditions encountered at the job site and, if necessary, in a manner which does not result in the release of toxic or harmful gases to the atmosphere.

When a chemical treatment agent such as calcium oxide is added to aqueous sludge an exothermic reaction results creating high temperatures sufficient to kill bacteria and the resultant odors caused thereby during dehydration of the sludge. The resulting reaction product comprises a hard friable material substantially free or odor, and which has toxic metals locked therein in an insoluble form. As the process tool is pulled through the lagoon, an accurate determination of the mixing effectiveness or degree of treatment can be made by sensing the tension in the pulling cable which increases as the reaction takes place and the sludge hardens so that the cable tension can be used to control the amount of chemicals to be added to the sludge.

SUMMARY OF THE INVENTION

The present invention accordingly provides a bi-directionally operable cable detoxification apparatus in which means are provided for conducting a supply of a selected treatment chemical from a remote site thereof to the process tool continuously during the path of travel of the process tool from edge to edge of the lagoon to be treated and for mixing such chemical into the waste to be treated. Gas containment means are disclosed which, in some instances, means may be necessary for preventing the escape of toxic or harmful gases generated near the process tool to the atmosphere.

DESCRIPTION OF THE PREFERRED EMBODIMENT

It is well known in the art that sludge lagoons may be contaminated with a wide range of toxic components such as soluble metals, complex organics, reacting sulfites, chlorinated hydrocarbons or a host of other hazardous species and that such lagoons may be harmful to the surrounding environment by contamination of the water table or otherwise. The chemicals used to treat such wastes depend upon the types and strengths of the wastes encountered in each lagoon.

Figure 1:
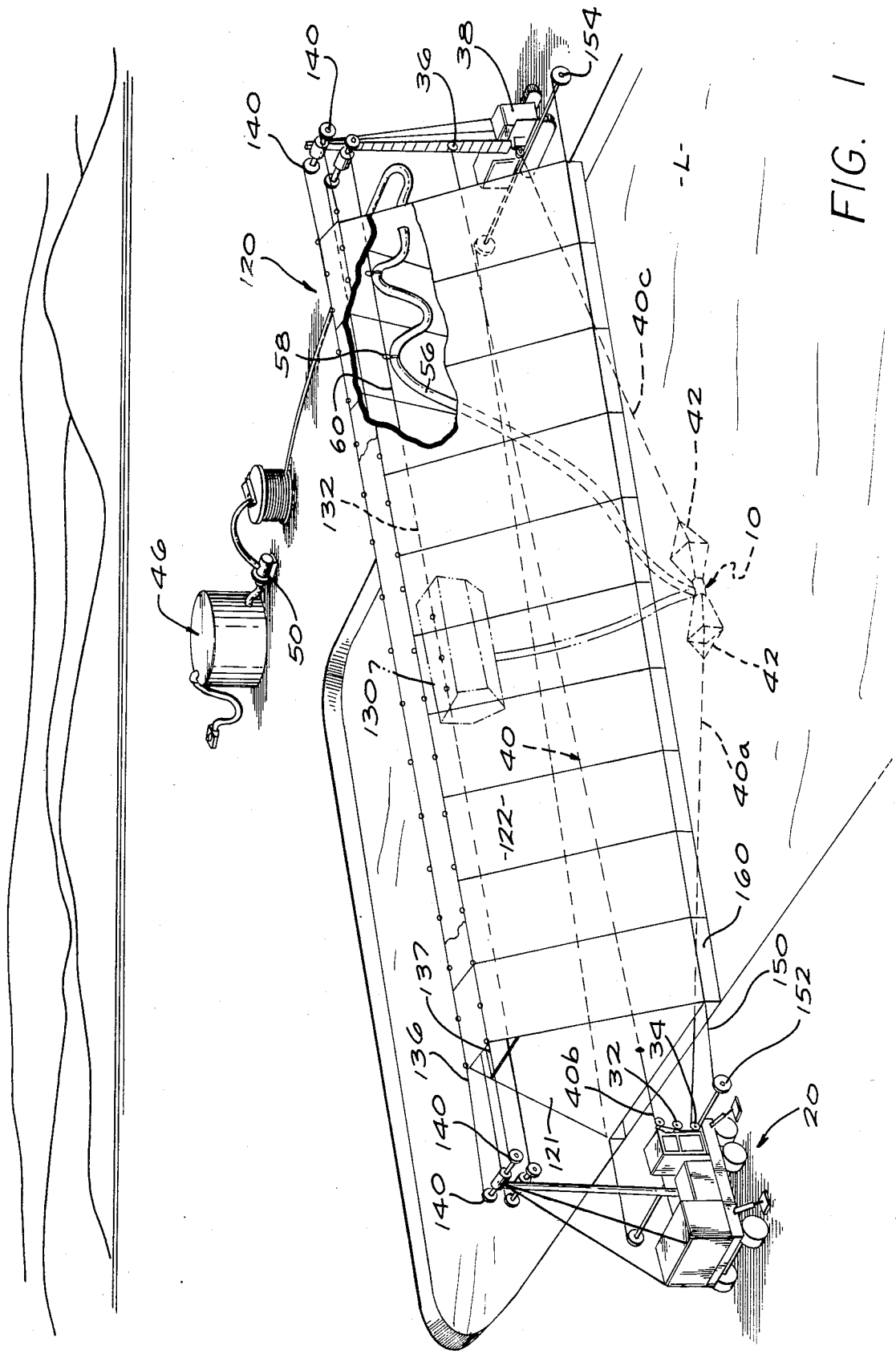
FIG. 1 of the drawings comprises a diagrammatic perspective view of a lagoon to be treated showing the cable treatment apparatus of the present invention in operative use in a gas containment shroud part of which is broken away for clarity.

As seen in FIG. 1, a waste impoundment laggon L is repeatedly traversed by a process tool 10 which is drawn across the lagoon by a winch 20 which preferably is mounted on a mobile control rig 30 at one side of the lagoon. The winch 20 is provided with an upper cable drum 32 from which cable 40 is payed out to the other side of the lagoon as the process tool 10 is pulled toward the winch 20. Cable 40a attached to the lead end of the process tool 10 as shown is simultaneously being taken up by a lower cable drum 34 on the winch 20. At the side of the lagoon opposite the winch 20 an idler sheave 36 is mounted on a suitable anchor rig 38. Upper reach 40b of the operating cable 40 is extended from the upper cable drum 32 of the winch 20 across the lagoon where it is trained around the idler sheave 36 and its free end 40c is then attached to a cable harness 42 affixed to the trailing end of the process tool 10. Similarly at the lead end of the process tool 10 an identical harness 42 is provided for attachment of the cable 40a which extends from the lower cable drum 34 of the winch 20.

Figure 2:
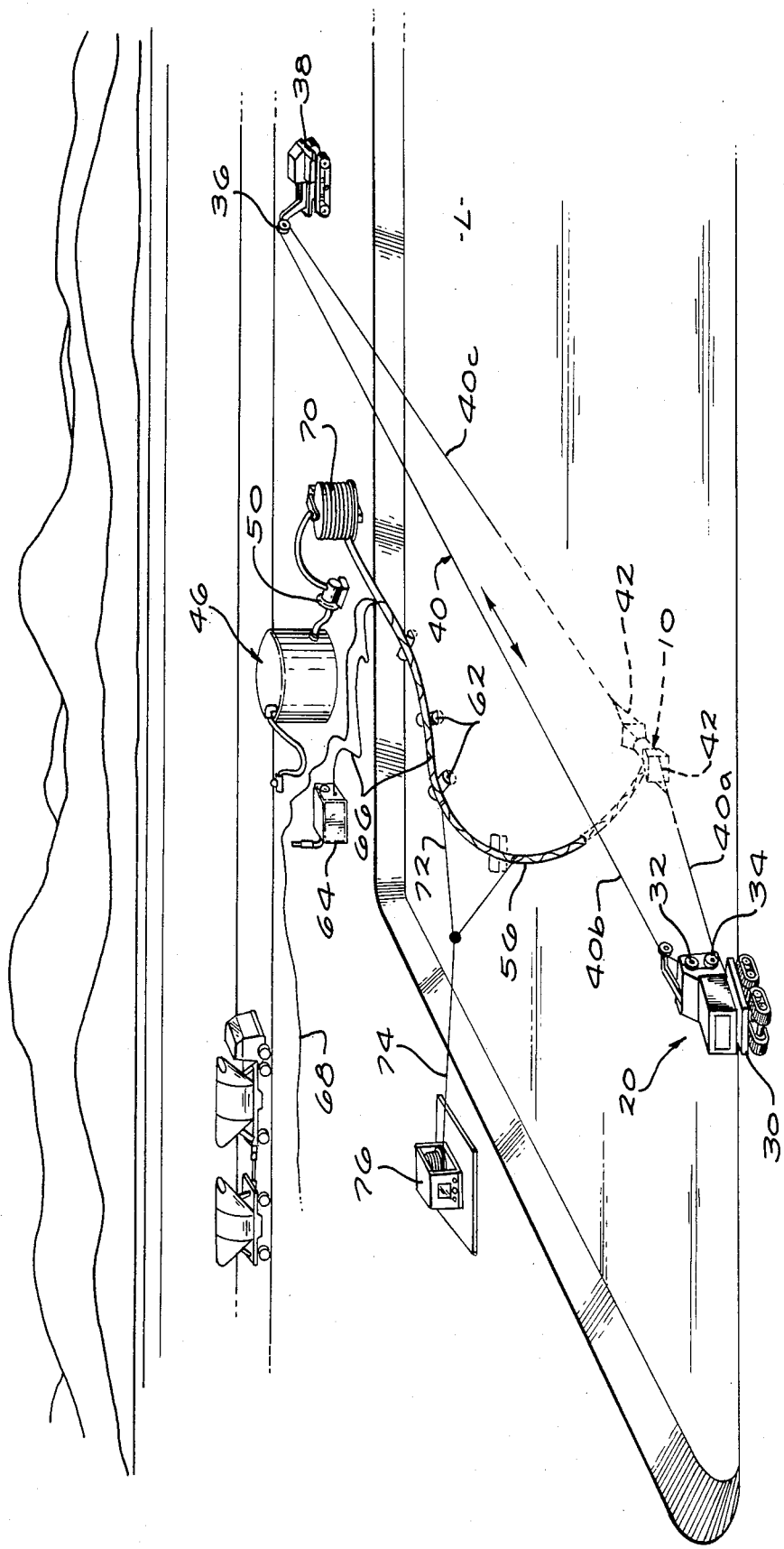
FIG. 2 is a perspective view, similar to FIG. 1, of an embodiment of the invention which uses a buoyant chemical supply conduit in certain environments where a gas containment shroud is not required.

At a remote location from the process tool 10 such as an on-shore site or, alternatively aboard a barge or raft (not shown) provided for this purpose, is a supply container 46 of chemical treatment agent to be used in detoxifying the lagoon. Treatment chemcials may thus be supplied to the process tool 10 by a pump 50 and automatically controllable valves which permit discharge of treatment chemical in amounts necessary to the process tool 10 via an umbilical conduit 56 which alternatively can be made buoyant as seen in FIG. 2. Umbilical conduit 56 is suspended by spaced roller supports 58 which in turn are rollably suspended on a tensioned support cable 60 extending between vertical booms on the control rig 30 and the anchor rig 38.

Umbilical conduit 56 is comprised in turn of one or more chemical supply hoses and electrical power lines and, in some instances an exhaust conduit (not shown) may be provided for gases generated in the vicinity of the process tool 10. Alternatively, floats 62 (FIG. 2) may be attached as necessary to the umbilical conduit 56 to maintain buoyancy instead of suspending the conduit 56 from a cable as seen in FIG. 1. Also shown is a take up reel 70 for eliminating excess length in the umbilical conduit 56 as it is payed out an taken up by the reel 70 during movement of the process tool 10 back and forth across the lagoon.

When a floating umbilical conduit 56 as seen in FIG. 2 is used, interference of the winch cable 40 with the umbilical conduit 56 is prevented by a positioning harness 72, positioning cable 74 and positioning winch 76 shown at one side of the lagoon and which pays out and takes up positioning cable 74 as necessary to keep the umbilical conduit 56 out of the way of the winch cable 40.

Figure 3:
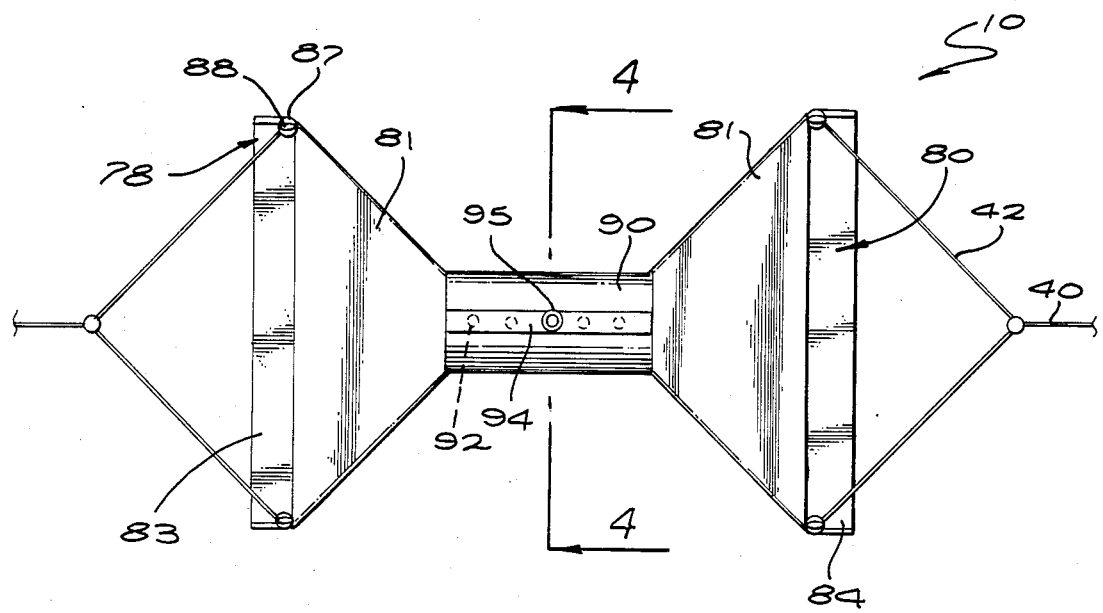
FIG. 3 is a plan view of the process tool used in the apparatus shown in FIG. 1.
Figure 4:
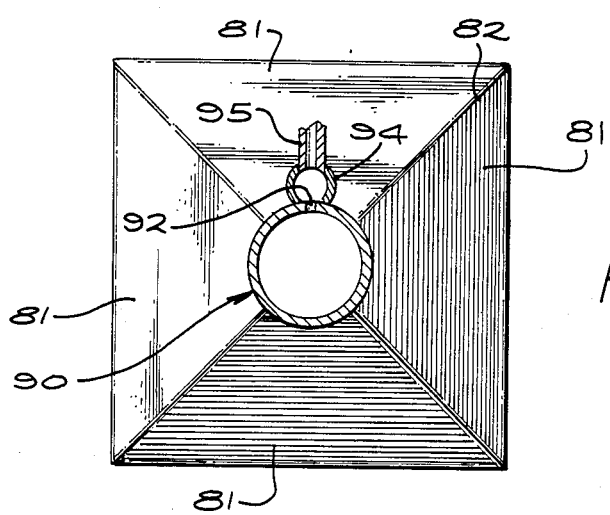
FIG. 4 is a vertical section taken along lines 4-4 in FIG. 3.
Figure 5:
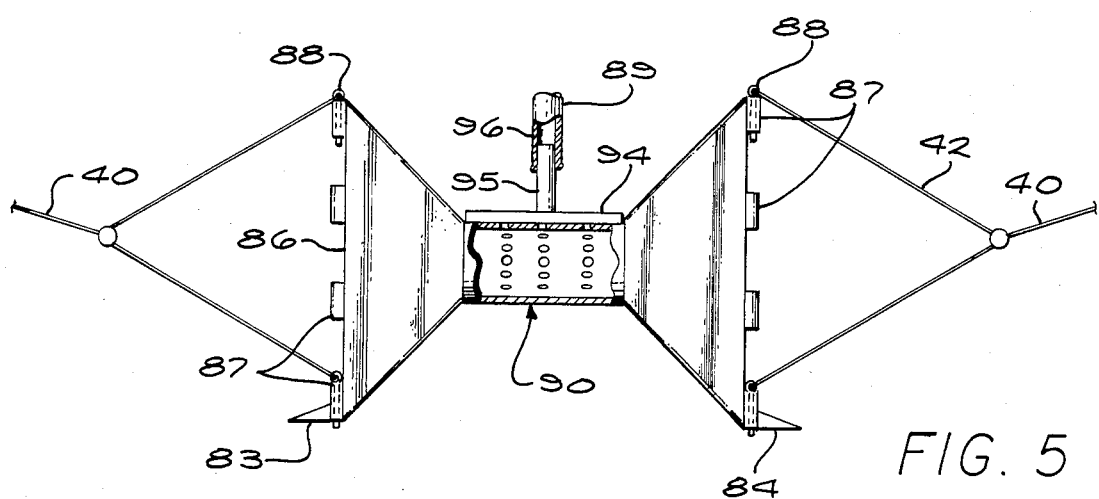
FIG. 5 is a side elevation view, partially broken away, of the process tool shown in FIG. 3.

FIGS. 3–5 shows several views of my improved process tool 10 which is symmetrical in shape and thus bi-directionally operable device. For the purpose of this description the left hand end 78 of the process tool 10 as seen in FIG. 3 will be considered the lead or inlet end and the right hand end 80 will be considered the outlet or trailing end but since the construction of both ends is the same, only one will be described. The inlet 78 is preferably comprised of four generally trapezoidal steel plates 81 welded together along their edges 82 to provide an inlet funnel which converges from its inlet end 78 to a mixing throat 90 centrally disposed between the inlet and outlet funnel sections of the process tool 10. Scraper blades 83, 84 are shown mounted on the lower edge of the inlet and outlet of the process tool 10 by welding. The scraper blades 83, 84 may be made adjustable so as to control the digging depthg thereof if desired.

The use of trapezoidally shaped plates 81 to form the inlet and outlet funnel sections of the process tool 10 has been found beneficial since vertical edges 86 (FIG. 5) of the two side plates 81 are conventiently used for attachment of the tool 10 to the cable harnesses 42. For this purpose vertically extending tubes 87 are welded to the vertical edges of the plates to provide receptacles for vertically extending attachment pins 88 affixed to the cable harnesses 42. A plurality of attachment tubes 87 is provided so that the harnesses 42 may be attached at selected elevations on the tool 10 so as to afford a degree of control of the attitude or digging depth of the tool as it is pulled through the lagoon.

The centrally located mixing throat 90 is preferably comprised of a cylindrical pipe section although it will be appreciated that rectangular, oval or other cross sections could be used if desired. The length of the throat 90 is selected to ensure adequate mixing of the lagoon contents with chemicals injected form a chemical supply hose 89 into the throat 90 through longitudinally spaced inlet ports 92 which extend through the wall of the throat 90. A chemical supply header 94 having a vertically extending leg 95 is sealingly affixed in telescoping relation with a downwardly extending coupling 96 fastened to the discharge end of the chemical supply hose 89. The header 94 is arranged so that chemical reagent is injected into throat 90 at a pluarlity of the ports 92 which are axially or circumferentially spaced along the throat 90 to ensure adequate mixing with the lagoon contents.

Figure 6:
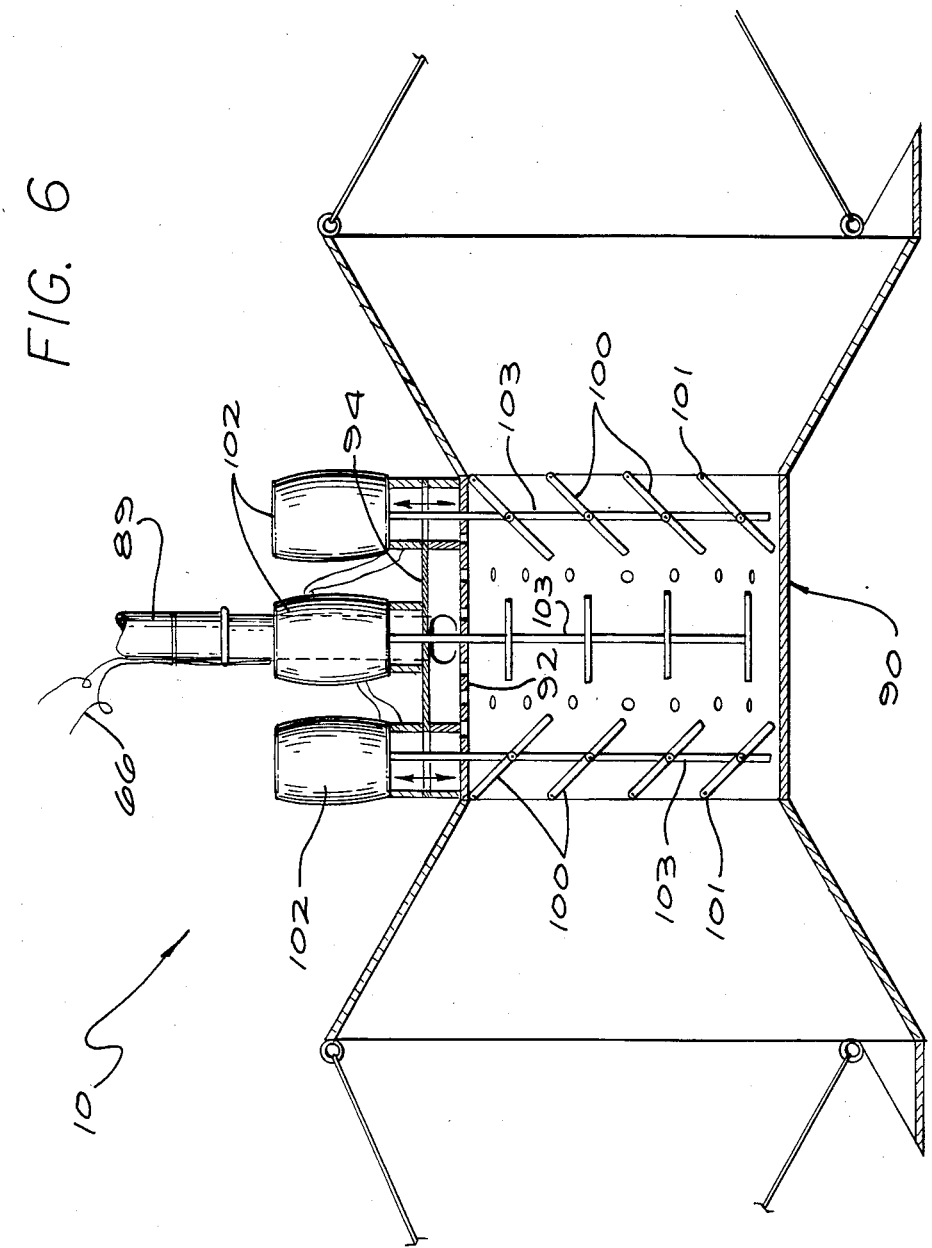
FIG. 6 is an enlarged view of the embodiment of the process tool of FIGS. 3-5 showing an adjustable baffle mixer throat in the process tool.

FIG. 6 shows a static mixer having adjustable baffles 100 mounted on hinges 101, the baffles 100 being disposed in the throat 90 of the process tool 10. Electrically powered adjustment motors 102 are provided to longitudinally move baffle positioning rods 103 which in turn are pivotally connected to the baffels 100 to control the angle of the baffles 100 to provide a serpentine circulation path which ensures adequate mixing without undue flow resistance of the process tool 10. Motors 102 are powered by the power cables 66, 68 which either extend from a remote source of electrical power 643 (FIG. 2) or from a stationary source (not shown) to the process tool 10 via the umbilical conduit 56.

Figure 7:
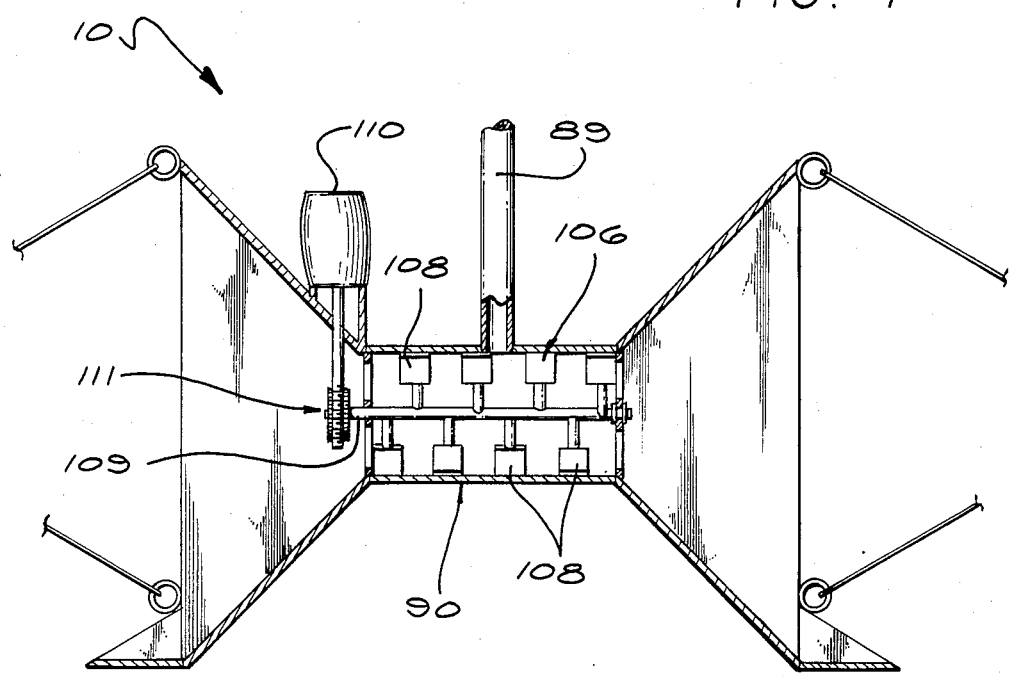
FIG. 7 shows a second embodiment of the process tool provided with a first form of powered mixer in the process tool throat.

FIG. 7 shows a first form of powered mixer 106 disposed in the throat 90 of the process tool 10. The mixer 106 comprises a plurality of mixing paddles 108 affixed to rotating axle 109 which is driven by a suitable motor 110 and transmission shown schematically at 111.

Figure 8:
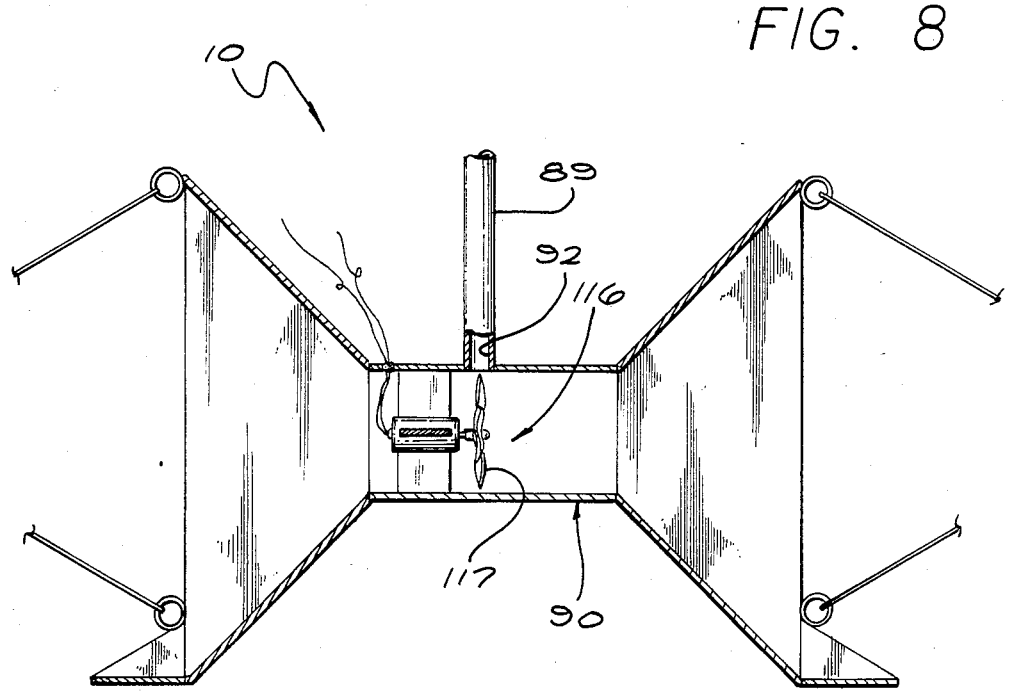
FIG. 8 shows a third embodiment of the process tool provided with a second form of powered mixer in the process tool throat.

FIG. 8 shows an alternative form of powered mixer 116 mounted in the centrally disposed throat 90 of the process tool 10. One suitable mixer of this type is commercially available from Flyght Corporation of Norwalk, Connecticut and comprises a propeller blade 117 mounted in the throat 90 with its axis of rotation horizontal and concentric with the axis of the throat 90. The blade 117 is preferably mounted equidistant in the horizontal direction between the chemical inlet ports 92 and its direction of rotation must be switched depending upon the direction of travel of the process tool 10 to ensure adequate mixing. The direction of rotation is chosen to propel the lagoon contents through the tool 10 and thus assist rather than impede the travel of the tool 10 through the lagoon and movement of lagoon contents through the throat 90.

Depending on the contents of the lagoon and on the chemical treatment agents used, toxic gases may be generated in substantial quantities in the vincinity of the process tool throat. Such gases may be environmentally unsafe and means such as a gas containment shroud 120 (FIG. 1) may be erected to enclose the area or strip of the lagoon above the process tool path of travel to prevent the escape of such gases to atmosphere.

As seen in FIG. 1, the tensioned cable 60 which extends between elevated booms at either side of the lagoon is used to support the umbilical conduit 56 which feeds liquid chemical treatment agent to the process tool. This arrangement is preferred whenever the thickness of the lagoon sludge is such as to impede the free movement of a floating umbilical conduit as in the FIG. 2 arrangement. The conduit 56 is supported from the cable 60 by the plurality of roller supports 58 which are freely moveable along the cable 60.

Also shown in FIG. 1, in phantom, is a travelling hopper 130 for dry powdered chemical treatment agent which is suspended on roller supports 131 hanging from a cable 132 which is laterally offset from the vertical plane which contains the process tool cable 40. Lateral offset is necessary to prevent the upper reach 40b of the process tool pulling cable 40 from interfering with the cable 132 from which the hopper 130 of dry powdered chemicals is suspended. It has been found that reversal of direction of travel of the process tool 10 results in vertical whipping of the upper reach 40b of the process tool pulling cable 40. If dry chemical reagents are to be mixed with the lagoon contents, a long length of chemical supply conduit 56 should be avoided due to the higher flow resistance of dry reagents as compared to liquid reagents. Therefore, instead of the shore based supply 46 of liquid chemical reagents, the suspended dry chemical hopper 130 will be employed. The hopper 130 is then pulled back and forth across the lagoon by the conduit 56 synchronously with the process tool 10 and in close proximity therewith. Only a relatively short length of conduit 56 extending from the hopper 130 to the tool 10 therebelow is required for this purpose.

Figure 9:
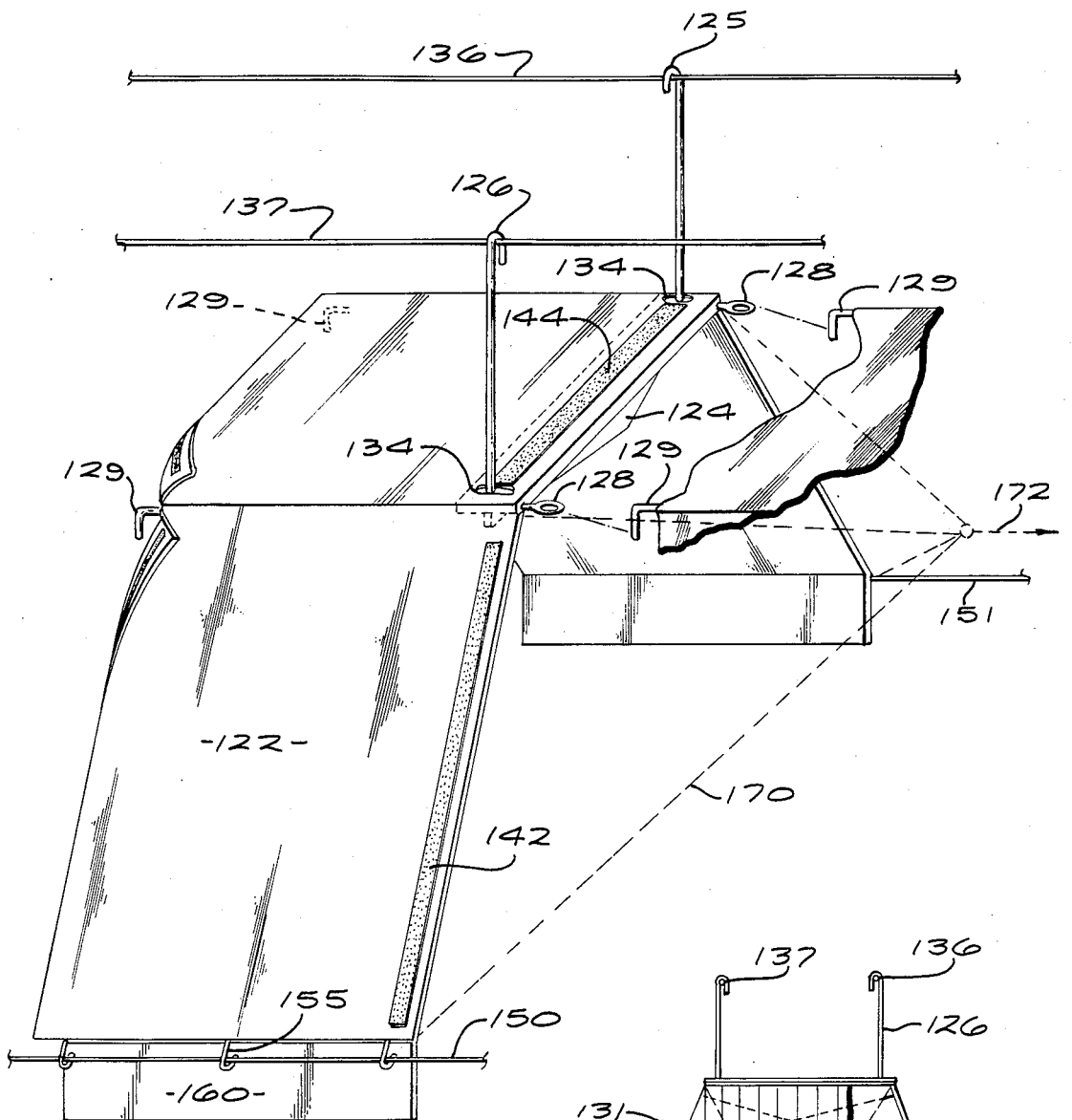
FIG. 9 is a diagrammatic, perspective view of one section of a multi-section gas collection shroud.
Figure 10:
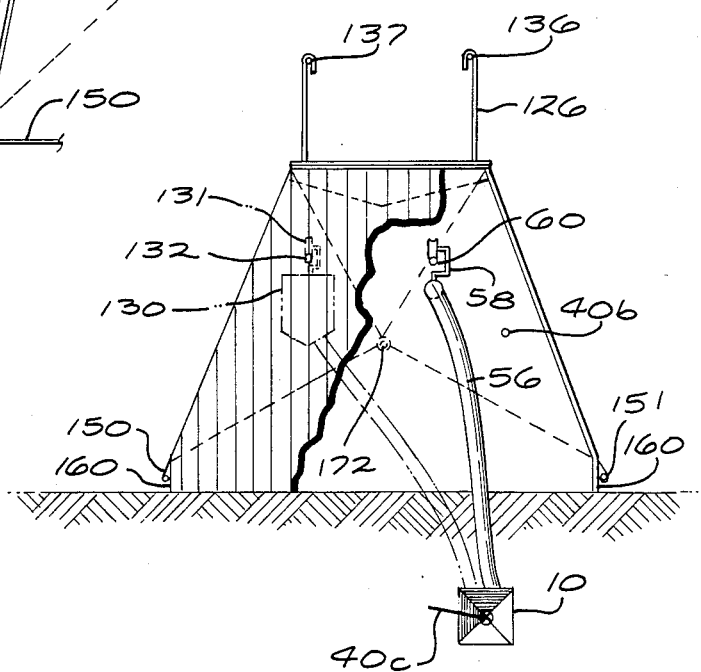
FIG. 10 is an end view of the gas collection shroud of FIG. 9.

The gas containment shroud 120, best seen in FIGS. 1, 9 and 10 comprises a pair of end panels 121 and a series of separable side panel sections 122 each comprised of a beam 124 at the top and flexible plastic/textile top and side sections. Each beam 124 comprises a rigid transversely extending structural member of nylon or other light weight material and has a pair of supporting hooks 126 affixed to the upper surface thereof. A pair of eyelets 128 are provided on one vertically extending side section 122 of the beam 124 and a pair of rigid structural hooks 129 are afffixed to the oppositely facing vertical side whereby a series of beams 124 may be hooked together to pull one another in either direction across the lagoon.

A pair of static tensioned shroud support cables 136, 137 is disposed across the lagoon between sheaves 140 on the upwardly extending booms and the beams 124 are then affixed by hooks 126 to the support cables 136, 137 one by one and are connected to each other by the hooks 129 and eyelets 128. Flexible shroud panel sections 122 having slotted apertures 134 in the top section for passage of the support hooks 126 therethrough are then draped over the beams 124 and have their ajoining vertical edges fastened to each other by VELCRO (Trademark) type fastener strips 142 disposed along the edges of the panel sections 122. The top horizontal portion of the panel section 122 is firmly affixed to the beam upper surface of similar fastening strips 144.

A pair of static tensioned bottom cables 150, 151 is deployed across the lagoon between bottom cable winches 152, 154 on the control rig 30 and the anchor rig 38 and the lower edges of the panels 122 are affixed by slidable hold down hooks 155 to the bottom tension cables 150, 151. Bottom skirts 160 are then affixed by fastener strips to the lower edges of the panels and engage the lagoon surface to prevent leakage of gases from under the lower edges of the panels 122.

Harnesses 170 at the ends of a shroud deployment and recovery cable 172 are affixed to the endmost beams 124 of the multi-panel shroud frames and to the lower edges of the flexible side panels 122 to deploy the shroud across the lagoon or to retrieve it.

The ends of the shrouded enclosure are covered by special end panels 121 (FIG. 10) of plastic/fabric having a plurality of vertical slots therein for freely permitting passage of the cable 40 for the process tool, the conduit 56 if a shore based supply of liquid chemicals is used, and for the dry chemical hopper support cable 132 if dry chemicals are to be used.

Persons skilled in the art will readily appreciate that various modifications can be made from the preferred embodiment thus the scope of protection is intended to be defined only by the limitations of the appended claims.

I claim:

1. Apparatus for mixing a treatment agent with waste materials in a liquid waste containing lagoon, comprising:
    (a) a bi-directionally operable process tool having means thereon for mixing a treatment agent with contents of said lagoon;
    (b) means for moving said tool along a path of movement through said lagoon from one side to the other side thereof;
    (c) buoyant conduit means for continuously conveying said treatment agent to said process tool from a remote supply of treatment agent during movement of said tool from one side of said lagoon to the other side thereof; and
    (d) means on said tool for continuously mixing said treatment agent with lagoon contents during movement of said tool through said lagoon.

2. The apparatus of claim 1, further comprising means for keeping said buoyant conduit from coming into contact with said cable.

3. The apparatus of claim 1, wherein said process tool has an inlet end, an outlet end and a mixing throat centrally disposed between said inlet and said outlet end, said inlet end and said outlet end each converging in cross section to said throat, said throat having inlet means in fluid communication with said means for supplying treatment agent and said inlet means being arranged to introduce treatment agent into said throat continuously during movement of lagoon contents through said process tool from said inlet end through said throat to said outlet end.

4. The appratus of claim 3, wherein said means for supplying treatment agent is a flexible conduit.

5. The apparatus of claim 4, further comprising power driven mixer means in said throat and power supply means in said flexible conduit.

6. The apparatus of claim 4, further comprising adjustable baffle means in said throat and means for adjusting the angle of said baffle means.

7. The apparatus of claim 3, further comprising means for containing gases generated as the process tool moves from one side of said lagoon to the other side thereof to prevent escape of said gases to atmosphere, said containing means comprising a flexible containment shroud, and a gas exhaust conduit extending from said shroud for conducting gases to a location outside of said shroud for treatment.

8. The apparatus of claim 7, wherein said shroud is a multi-section shroud supported from a plurality of shroud support cables.

9. The apparatus of claim 8, wherein each shroud section is comprised of a support beam, means for suspending said support beam from said support beam and rigid connectors on said beam for connecting a plurality of said support beams together.

10. The apparatus of claim 9, further comprising a slotted flexible end panel at either end of said shroud.

11. The apparatus of claim 10, wherein said means for moving said tool through said lagoon comprises cable means affixed to said process tool and trained around a power driven cable drum at one side of the lagoon and an idler sheave anchored at the other side of the lagoon.

12. Apparatus for mixing a treatment agent with waste materials in a liquid waste containing lagoon, comprising:
(a) a bi-directionally operable process tool having means thereon for mixing a treatment agent with contents of said lagoon.
(b) means for moving said tool along a path of movement through said lagoon from one side to the other side thereof;
(c) support cable means extending above and across said lagoon along the path of movement of said process tool;
(d) conduit means for continuously conveying said treatment agent from a remote supply of treatment agent to said process tool during movement of said process tool from one side of said lagoon to the other side thereof, said conduit means supported from said support cable; and
(e) means on said tool for continuously mixing said treatment agent with lagoon contents during movement of said tool through said lagoon.

13. The apparatus of claim 12, wherein said process tool has an inlet end, an outlet end and a mixing throat disposed between said inlet end and said outlet end, said inlet end and said outlet end each converging in cross section to said throat, said throat having inlet means in fluid communication with said means for supplying treatment agent and said inlet means being arranged to introduce treatment agent into said throat continuously during movement of lagoon contents through said process tool from said inlet end through said throat to said outlet end.

14. The apparatus of claim 13, wherein said means for supplying treatment agent is a flexible conduit.

15. The apparatus of claim 14, further comprising power driven mixer means in said throat and power supply means in said flexible conduit.

16. The apparatus of claim 14, further comprising adjustable baffle means in said throat and means for adjusting the angle of said baffle means.

17. The apparatus of claim 13, further comprising means for containing gases generated as the process tool moves from one side of said lagoon to the other side thereof to prevent escape of said gases to atmosphere, said containing means comprising a flexible containment shroud and a gas exhaust conduit extending from said shroud for conducting gases to a location outside of said shroud for treatment.

18. The apparatus of claim 17, wherein said shroud is a multi-section shroud supported from a plurality of shroud support cables.

19. The apparatus of claim 18, wherein each shroud section is comprised of a support beam, means for suspending said support beam from said support cables, a flexible panel section supported by said support beam and rigid connectors on said beam for connecting a plurality of said support beams together.

20. The apparatus of claim 19, further comprising a slotted flexible end panel at either end of said shroud.

21. The apparatus of claim 20, wherein said means for moving said tool through said lagoon comprises cable means affixed to said process tool and trained around a power driven cable drum at one side of the lagoon and an idler sheave anchored at the other side of the lagoon.

22. Apparatus for mixing a treatment agent with waste materials in a liquid waste containing lagoon, comprising:
(a) a bi-directionally operable process tool having means thereon for mixing a treatment agent with contents of said lagoon;
(b) means for moving said tool along a path of movement through said lagoon from one side to the other side thereof;
(c) support cable means extending above and across said lagoon along the path of movement of said process tool and laterally displaced therefrom;
(d) moveable hopper means for continuously conveying said treatment agent to said process tool during movement of said process tool from one side of said lagoon to the other side thereof, said hopper being supported from said support cable near said process tool;
(e) means for moving said hopper across said lagoon in timed relationship with said process tool as said process tool moves thereacross; and
(f) means on said tool for continuously mixing said treatment agent with lagoon contents during movement of said tool through said lagoon.

23. The apparatus of claim 22, further comprising a conduit extending between said hopper and said process tool for conveying treatment agent from said hopper to said process tool.

24. The apparatus of claim 23, wherein said process tool has an inlet end, an outlet end and a mixing throat disposed between said inlet end and said outlet end, said inlet end and said outlet end each converging in cross section to said throat, said throat having inlet means in fluid communication with said means for supplying treatment agent and said inlet means being arranged to introduce treatment agent into said throat continuously during movement of lagoon contents through said process tool from said inlet end through said throat to said outlet end.

25. The apparatus of claim 24, wherein said means for supplying treatment agent is a flexible conduit.

26. The apparatus of claim 25, further comprising power driven mixer means in said throat and power supply means in said flexible conduit.

27. The apparatus of claim 25, further comprising adjustable baffle means in said throat and means for ajusting the angle of said baffle means.

28. The apparatus of claim 24, further comprising means for containing gases generated as the process tool moves from one side of said lagoon to the other side thereof to prevent escape of said gases to atmosphere, said containing means comprising a flexible containment shroud and a gas exhaust conduit extending from said shroud for conducting gases to a location outside of said shroud for treatment.

29. The apparatus of claim 28, wherein said shroud is a multi-section shroud supported from a plurality of shroud support cables.

30. The apparatus of claim 29, where each shroud section is comprised of a support beam, means for suspending said support beam from said support cables, a flexible panel section supported by said support beam and rigid connectors on said beam for connecting a plurality of said support beams together.

31. The apparatus of claim 30, further comprising a slotted flexible end panel at either end of said shroud.

32. The apparatus of claim 31, wherein said means for moving said tool through said lagoon comprises cable means affixed to said process tool and trained around a power driven cable drum at one side of the lagoon and an idler sheave anchored at the other side of the lagoon.

* * * * *